Feb. 9, 1937.  C. M. EVELETH  2,069,916
WEATHER STRIP
Filed Feb. 15, 1935  2 Sheets-Sheet 1
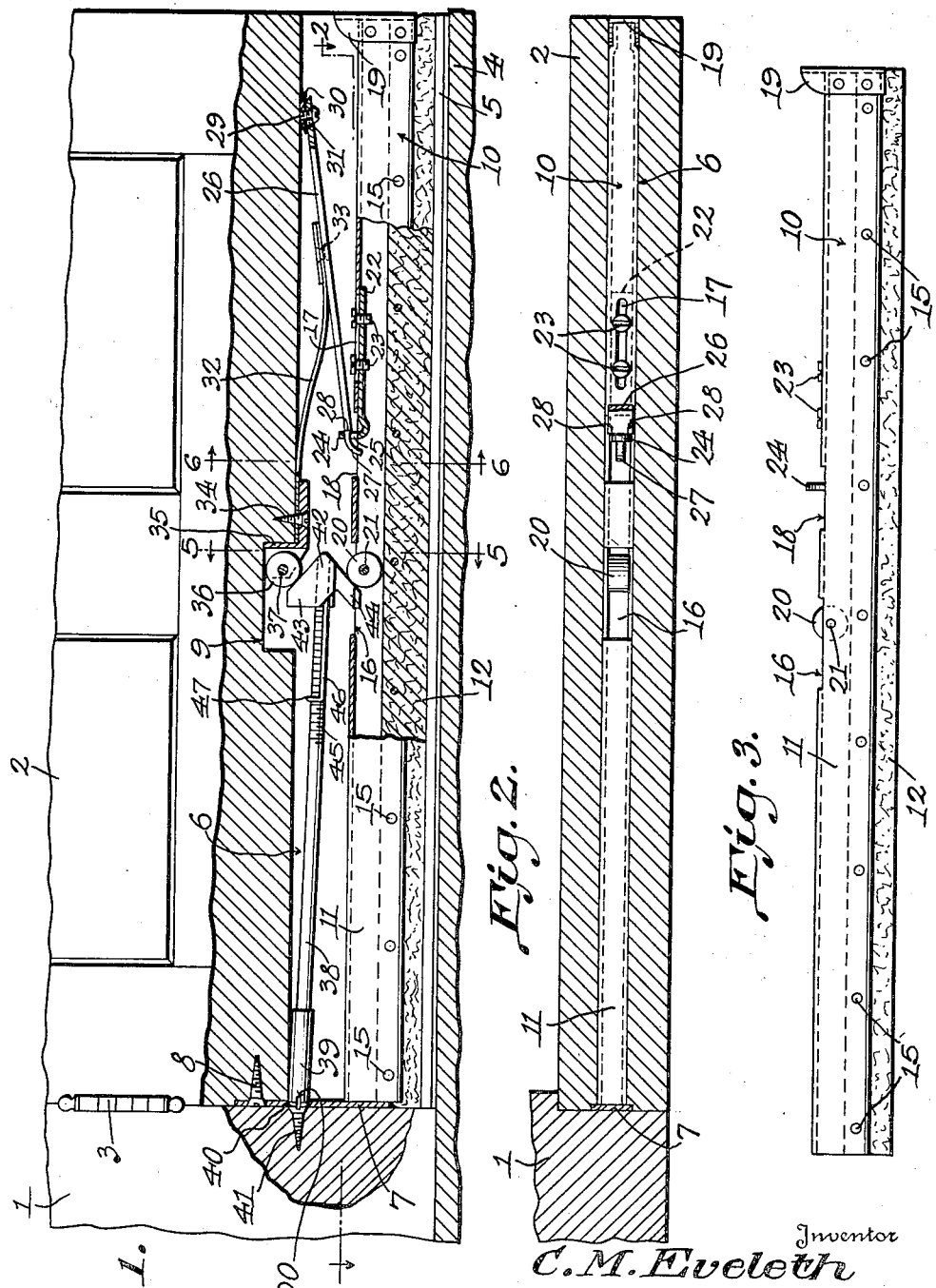
Inventor
C. M. Eveleth Feb. 9, 1937.  C. M. EVELETH  2,069,916
WEATHER STRIP
Filed Feb. 15, 1935   2 Sheets-Sheet 2
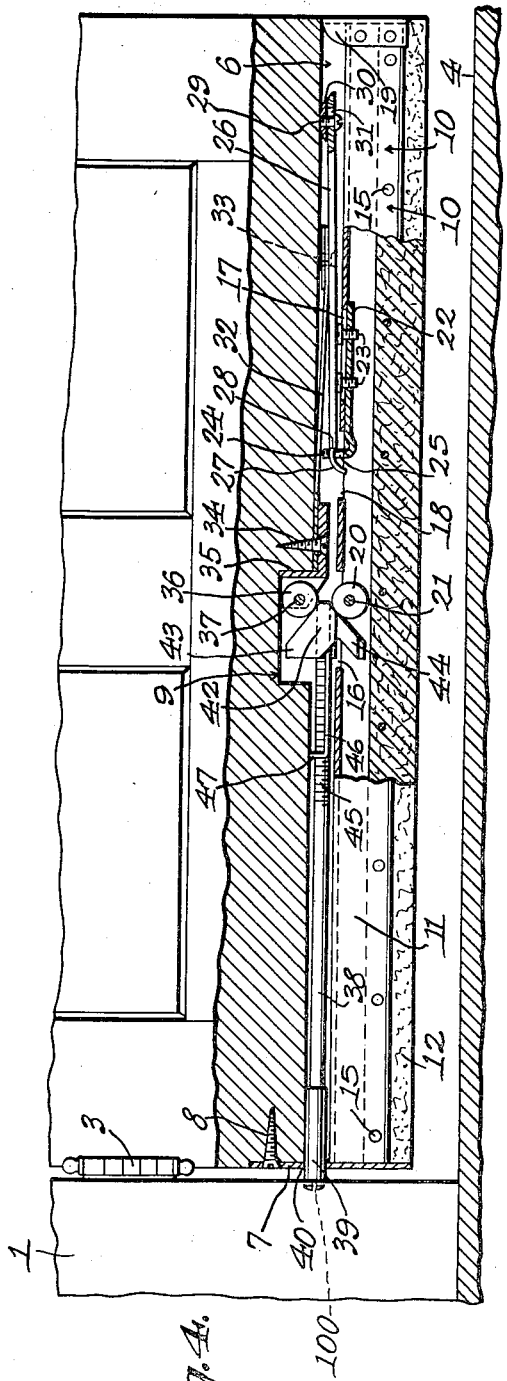
Inventor
C. M. Eveleth
By C. A. Snow & Co.
Attorneys Patented Feb. 9, 1937

2,069,916

UNITED STATES PATENT OFFICE 2,069,916

WEATHER STRIP

Clarence M. Eveleth, River Forest, Ill.

Application February 15, 1935, Serial No. 6,738

3 Claims. (Cl. 20—68)

This invention is used to stop a draft under a door. It includes a vertically movable wind check carried by the door and downwardly movable to engage the door sill. The objects of the invention include: improvements in the construction of the wind check, in the means for mounting it in the door, in the means for raising the wind check, in the means for lowering it, in the means for removing the wind check upon occasion, and in the means for affording desirable adjustments.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in elevation, a device constructed in accordance with the invention, parts being broken away, and the wind check being depressed; Fig. 2 is a section on the line 2—2 of Fig. 1; Fig. 3 is an elevation of the wind check; Fig. 4 shows in elevation, a device constructed in accordance with the invention, parts being broken away, and the wind check being elevated; Figs. 5 and 6 are sections taken, respectively, on the lines 5—5 and 6—6 of Fig. 1; Fig. 7 is a view similar to Fig. 4, parts being broken away, and the view showing the wind check in the process of removal or insertion.

The numeral 1 marks a support, such as a door jamb. To it, a horizontally swinging door or closure 2 is hinged at 3. The floor is shown at 4, and the door sill at 5.

The door 2 is provided in its lower edge with a recess 6, in the form of a parallel-walled groove. The recess 6 extends entirely across the door 2, from the inner edge of the door to the outer edge thereof. A guide plate 7 is let into the inner edge of the door 2 and closes the inner end of the recess 6. The guide plate 7 is detachably connected to the door 2 by securing elements 8. The door 2 is supplied with an upwardly extended chamber 9, which opens downwardly into the recess 6. This is shown most plainly in Fig. 1.

The numeral 10 designates a wind check, adapted to cooperate with the door sill 5 to stop draft under the door 2, and the wind check is mounted in the recess 6 for vertical movement. The wind check 10 is a composite structure comprising an inverted, trough-shaped metal body 11. A yieldable foot 12 (made of felt, rubber or the like) is mounted in the lower part of the body 11 and is the portion of the wind check 10 that has immediate contact with the door sill 5. The foot 12 is held in the body 11 of the wind check 10 by inwardly extended flanges 14 on the body (see Figs. 5 and 6). Securing elements 15, passing through the foot 12 and the side walls of the body 11, also aid in holding the foot in the body.

A first opening 16 is formed in the top of the body 11 of the wind check 10. The first opening 16 is disposed below the chamber 9 in the door 2. There is an elongated slot 17 in the top of the body 11. The slot 17 is disposed between the first opening 16 and the outer edge of the door 2. A second opening 18 is formed in the top of the body 11. The second opening 18 is disposed between the first opening 16 and the slot 17.

On the outer end of the body 11 of the wind check 10 there is upstanding closure and stop 19, located flush with the outer edge of the door 2. The part 19 is called a closure because, when the wind check 10 is raised, as shown in Fig. 4, by a spring means hereinafter described, the part 19 closes the upper portion of the recess 6, at the outer edge of the door 2; and the part 19 is called a stop because, when it is in the position referred to, it limits the upward movement of the wind check 10. Intermediate its ends, the wind check 10 is provided with a projection. The said projection preferably is a roller 20, extending upwardly through the first opening 16. The roller 20 is journaled on a shaft 21, secured at its ends in the side walls of the body 11 of the wind check 10.

An anchor strip 22 is located underneath the top of the body 11 of the wind check 10 at the slot 17. Clamp members 23, such as screws, extend through the slot 17 and engage the anchor 22 and the top of the body 11 of the wind check 10. The screws 23 and the slot 17 provide for an endwise adjustment of the anchor 22. On its inner end, the anchor 22 has an upstanding finger 24. The finger 24 extends upwardly through the second opening 18 in the top of the body 11 of the wind check 10. Figures 6 and 1, for instance, show that there is a hole 25 in the finger 24 of the anchor 22.

The numeral 26 designates a radius arm located in the recess 6 of the door 2. The radius arm 26 is stiff enough so that it will not yield transversely. At its inner end, the radius arm 26 has a reduced extension 27, which is downwardly curved and extended through the hole 25 in the finger 24 of the anchor 22. The extension 27 forms transverse shoulders 28 in the radius arm 26. The radius arm 26 is provided in one end with an enlarged opening 31, through which passes a securing device 29, attaching a washer 30 loosely to the outer end of the radius arm 26. The washer 30 lies flat against the upper wall of the recess 6, and prevents the outer end of the radius arm 26 from wearing or digging into the wood of the door 2, at the top of the recess 6. The outer end of a curved spring 32 is rigidly secured at 33 to the intermediate portion of the radius arm 26 and has a tendency to raise the radius arm and the wind check 10. The inner end of the spring 32 is connected by a securing device 34 to the door 2 at the top of the recess 6. The securing device 34 holds an angle bracket 35 on the door 2, with the vertical part of the angle bracket in the chamber 9 of the door 2, in engagement with the right hand wall of the chamber 9, as shown in Figs. 1, 4, and 7.

The angle bracket 35 carries an abutment, such as a roller 36, journaled at 37 on the vertical part of the angle bracket.

The right hand end of the first opening 16 should come directly under the right hand end wall of the chamber 9. Therefore, the distance from the right hand end of the chamber 9 to the right hand edge of the door 2 is exactly the same as the distance from the right hand end of the opening 16 to the right hand end of the wind check 10. When installing this device in a door, the groove or recess 6 is made first. Then the chamber 9 is made. In order to determine just where to make the chamber 9, the wind check 10 is turned end for end from the position shown in Fig. 4, for instance. The wind check 10 is placed in the recess 6, in such a position that what is the right hand end of the opening 16 in Fig. 4 will come exactly at the right hand edge of the door 2. A sharp pointed tool is placed against the part 19 (which is now within the recess 6), and a mark is made in the door 2, at the top of the recess 6. This determines just where the right hand wall of the chamber 9 ought to be. If the wind check 10 now is turned end for end, back to the position of Fig. 4, in the recess 6, the aforesaid mark will be directly over the right hand end of the opening 16. The chamber 9 is cut out toward the left, from the aforesaid mark. Assuming that no error was made in determining the place for the right hand end wall of the chamber 9, that the chamber is started accurately at the mark, and that the vertical part of the bracket 35 is held tightly against the right hand wall of the chamber 9, when the bracket is secured to the door, the parts will assemble correctly and properly, the anchor 22 being adjusted at the factory, by means of the screws 23, so that when the conditions above described obtain the upstanding part 24 of the anchor fits snugly against the shoulders 28 of the radius arm or thrust arm 26.

Trouble begins if the workman fails to make the right hand wall of the chamber 9 just where it ought to be. If an error of one sixteenth of an inch to the right occurs, then the wind check 10 will project one sixteenth of an inch beyond the free edge of the door 2. If an error of one sixteenth of an inch to the left is made, the wind check 10 will be that much too far to the left. It is not practical to move the bracket 35, but the wind check 10 can be taken out of the door, the screws 23 loosened, and the anchor 22 adjusted until either end of the wind check 10 is exactly where it should be, namely, flush with the corresponding vertical edge of the door 2.

The numeral 38 designates an operating member for depressing the wind check 10, when the door 2 is swung from the open position of Fig. 4 to the closed position of Fig. 1. The operating member 38 is a rod, having a slightly enlarged foot 39 which slides and tilts in an opening 40 in the guide plate 7 on the inner edge of the door 2. An abutment screw 41 is threaded into the door jamb or support 1, and engages the foot 39 of the operating rod 38, when the door 2 is closed, to prevent the foot of the operating rod from digging into the door jamb 1. An approximately triangular head 42 is threaded at 45 for adjustment on the inner end of the operating rod 38. The head 42 comprises diverging, oppositely slanting upper and lower arms, designated at 43 and 44, respectively. The inclined surface of the upper arm 43 is adapted to engage the abutment roller 36 on the door 2. The inclined surface of the lower arm 44 is adapted to engage the projection or roller 20 on the wind check 10. The head 42 is threaded at 45 on the operating rod 38, so that the upper arm 43 will engage the abutment roller 36 and so that the lower arm 44 will engage the roller 20, and give the vertical throw to the wind check 10. The spaces under doors vary considerably, some being large and some being small. In order to get a proper adjustment, a screw driver is inserted into a screw driver slot 100 in the outer end of the part 39 of the operating rod 38, and the rod 38 is rotated until, when the door is closed, the part 12 of the wind check 10 meets the door sill properly. In order to maintain this adjustment, in other words to prevent the rod 38 from turning, saving at the will of an operator, a spring brake rod 46 is secured at one end to the head 42 and is provided at its opposite end with a transverse hook-shaped part 47 that bears frictionally on the threaded part 45 of the operating rod 38. The head 42 is prevented from turning, when the rod 38 is rotated for adjustment, because, as shown in Fig. 5, the head fits with reasonable closeness in the recess 6 and in the chamber 9.

In practical operation, when the door 2 is opened, and when the wind check 10 is raised as in Fig. 4, by the action of the spring strip 32 and the radius arm 26, the roller 20 on the wind check is brought close to the abutment roller 36 on the door 2, and the operating rod 38 is pushed to the left, the rollers 36 and 20 cooperating, respectively, with the inclined surfaces of the arms 43 and 44 of the head 42 on the operating rod 38, the foot 39 on the operating rod projecting outwardly a little beyond the guide plate 7.

When the door 2 is closed, as in Fig. 1, the foot 39 of the operating rod 38 engages the abutment screw 41 in the door jamb 1, the rod 38 is advanced, and carried downwardly at its inner end, due to the cooperation between the inclined surface of the arm 43 of the head 42 and the abutment roller 36 on the door 2. As the operating rod 38 moves inwardly and downwardly, the inclined edge of the arm 44 on the head 42, cooperating with the roller 20 on the wind check 10, carries the wind check downwardly until the part 12 of the wind check bears on the door sill 5. When the door 2 is opened, the parts resume the position of Fig. 4, due to the action of the spring 32 on the radius arm 26.

In order to take out the wind check 10 for repair, the guide plate 7 is taken off and the wind check is moved to the left in Fig. 7, to disengage the finger 24 of the anchor 22 from the extension 27 of the radius arm 26, and then the wind check can be displaced by moving it downwardly. In order to replace the wind check 10, it is shoved upwardly into the recess 6 of the door 2, with the finger 24 a little to the left of the extension 27 of the radius arm 26 in Fig. 7. Then the wind check 10 is moved to the right until the extension 27 of the radius arm is received in the hole 25 of the finger 24 on the anchor 22. The guide plate 7 then is secured to the inner edge of the door 2.

Having thus described the invention, what is claimed is:

1. In a device of the class described, a wind check mountable for transverse movement in a closure hinged to a jamb, a member engaging one end of the wind check to limit the longitudinal movement of the wind check in one direction, means for securing said member detachably to the closure, a radius arm one end of which has sliding engagement with the closure, releasably interengaged elements on the wind check and on the radius arm, forming a pivotal connection between the radius arm and the wind check and cooperating to limit the longitudinal movement of the wind check in an opposite direction, the wind check being movable longitudinally in the first specified direction, when said member is detached from the closure, thereby to disengage the interengaged elements and to permit the wind check to be removed from the closure, spring means for retiring the wind check with respect to the closure, the springs means being connected to the intermediate portion of the radius arm, means for connecting the spring means to the closure, and jamb-engaging mechanism for advancing the wind check with respect to the closure, when the closure is closed.

2. In a device of the class described, a wind check, means for mounting the wind check in a swinging closure for transverse movement, a radius arm, means for connecting one end of the radius arm pivotally to the wind check, the opposite end of the radius arm having sliding engagement with the closure, a spring strip connected to the intermediate portion of the radius arm and to the closure for retiring the wind check with respect to the closure, and mechanism for advancing the wind check with respect to the closure when the closure is closed.

3. In a device of the class described, a closure, a wind check vertically movable in the closure, an anchor adjustable longitudinally of the wind check, means for holding the anchor in adjusted positions longitudinally of the wind check, a radius arm, one end of the radius arm having sliding engagement with the closure, detachably interengaged elements forming a pivotal connection between the opposite end of the radius arm and the anchor, a lifting spring connected to the intermediate portion of the radius arm and to the closure, spaced projections on the closure and on the wind check, and a jamb-engaging operating member slidable on the closure and including a part entering between the projections to depress the wind check.

CLARENCE M. EVELETH.